J. PIERSON.
WHIFFLETREE CLIP AND HOOK.
APPLICATION FILED APR. 21, 1909.

945,593.

Patented Jan. 4, 1910.

ATTEST.
Bent. M. Stahl
Ewd. L. Tolson.

INVENTOR.
JOHN PIERSON.
By Spear Middleton Donaldson & Spear
ATTYS.

UNITED STATES PATENT OFFICE.

JOHN PIERSON, OF INGERSOLL, OKLAHOMA.

WHIFFLETREE CLIP AND HOOK.

945,593. Specification of Letters Patent. Patented Jan. 4, 1910.

Application filed April 21, 1909. Serial No. 491,627.

*To all whom it may concern:*

Be it known that I, JOHN PIERSON, citizen of the United States, residing at Ingersoll, Oklahoma, have invented certain new and useful Improvements in Whiffletree Clips and Hooks, of which the following is a specification.

My invention is an improvement upon Letters Patent 865932 granted to me September 10, 1907. This patent described a whiffle tree in which the hook attaching device is made of sheet metal with side flanges designed to penetrate the wood and having lip portions to receive a loop which in turn held the hook.

My present invention is designed as an improvement over the construction shown in my former patent and includes not only a change in the clip but in the hook also.

Figure 1:
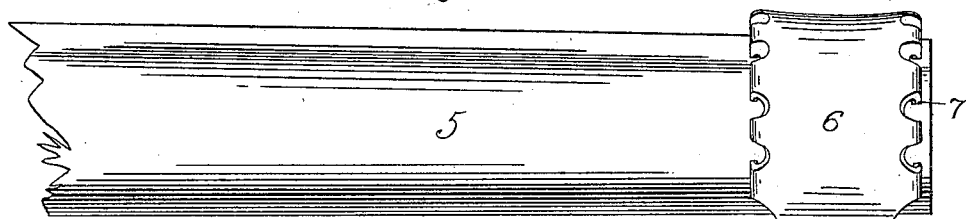
Figure 2:
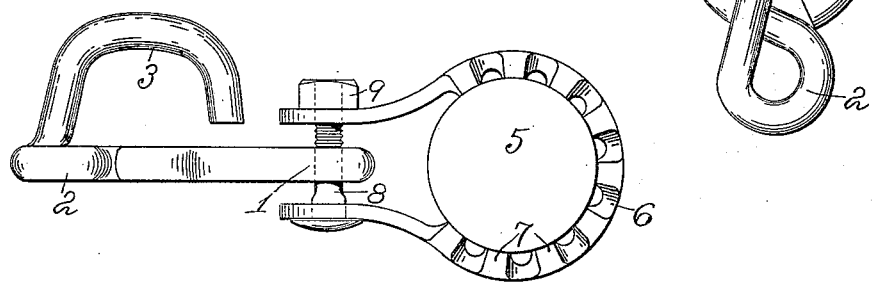
Figure 3:
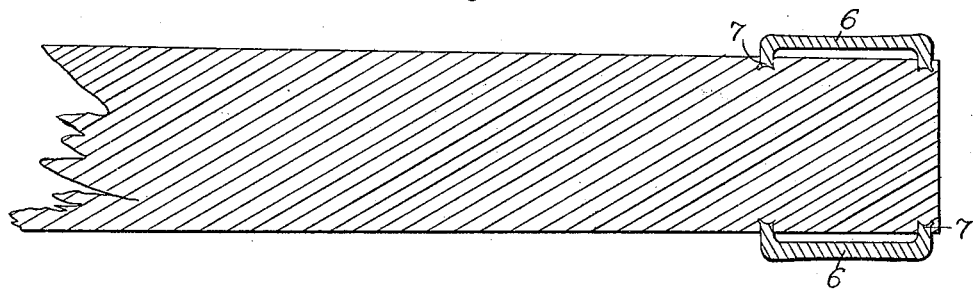

In the accompanying drawing, Figure 1 is a view of a whiffle tree with my invention applied. Fig. 2 is an end view of the same, and Fig. 3 is a sectional view.

The whiffle tree which is of ordinary construction, is shown at 5 and my improved clip at 6. It is provided with turned in teeth on each edge, indicated at 7, and in applying the clip to the whiffle tree these teeth penetrate the wood and hold the clip securely in place. With this form of holding means for the clip it is not necessary to provide the annular grooves described in my former patent, as the teeth penetrate the wood sufficiently without the making of grooves to securely hold the clip in place.

The lower ends of the clip are held together by a headed bolt 8 with a nut 9 upon its threaded end. This bolt supports the whiffle tree hook which is of improved construction. It has an eye or loop 1, which serves as the connection between the hook and the clip. The hook is made of stout steel wire and after being formed into the loop or eye 1 the metal is bent around to form a smaller eye 2, and then the metal is bent substantially at right angles rearwardly and then around into the form of a hook 3, with the end of the wire centrally of the opening in the loop 1. The construction is such that no detachment can take place in the connection between the hook and the clip, and while an easy connection is made with the hook the construction is such that from the hook 3 the connecting ring passes over the hook and down into the eye 2 where it is securely held and prevented from detachment.

What I claim is:—

In combination with a whiffle tree clip, a hook having a loop or eye engaging the clip and a second eye lying in the same plane therewith, said second eye terminating in a hook located in a plane at right angles to the eyes and the end of the hook terminating approximately centrally of the first eye.

In testimony whereof, I affix my signature in presence of two witnesses.

JOHN PIERSON.

Witnesses:
J. H. SCHAEFER,
J. B. SCHAEFER.